United States Patent [19]

Kalota et al.

[11] Patent Number: 4,871,109
[45] Date of Patent: Oct. 3, 1989

[54] VAPOR PHASE SOLDERING USING CERTAIN PERFLUORINATED POLYETHERS

[75] Inventors: Dennis J. Kalota, Fenton; John S. McConaghy, Jr., St. Louis; David O. Fisher, Chesterfield, all of Mo.; Ronald E. Zielinski, Fort Wayne, Ind.

[73] Assignee: Monsanto Company, St. Louis, Mo.

[21] Appl. No.: 149,773

[22] Filed: Jan. 29, 1988

[51] Int. Cl.$^4$ .............................................. B23K 1/02
[52] U.S. Cl. .................. 228/180.1; 228/240; 252/78.1; 568/615
[58] Field of Search ...................... 252/78.1; 568/615; 228/180.1, 240

[56] References Cited

U.S. PATENT DOCUMENTS

| | | | |
|---|---|---|---|
| Re. 30,399 | 9/1980 | Ammann et al. | 228/180 R |
| 2,500,388 | 3/1950 | Simons | 252/78.1 |
| 3,866,307 | 2/1975 | Pfahl, Jr. et al. | 29/498 |
| 3,904,102 | 9/1975 | Chu et al. | 228/180 |
| 3,947,240 | 3/1976 | Pfahl, Jr. | 432/28 |

Primary Examiner—Robert A. Wax
Attorney, Agent, or Firm—Wendell W. Brooks; Richard H. Shear; Arnold H. Cole

[57] ABSTRACT

A perfluorinated polyether having the formula $$R_fO-(CF_2CF_2O)_n-R'_f$$

wherein $n=3-11$ and $R_f$ and $R_f'$ are perfluorinated $C_1$-$C_5$ alkyl radicals is used in vapor phase soldering applications. Especially useful for such applications is perfluoroheptaglyme.

16 Claims, 1 Drawing Sheet

VAPOR PHASE SOLDERING USING CERTAIN PERFLUORINATED POLYETHERS

BACKGROUND OF THE INVENTION

I. Field of the Invention

The present invention relates to soldering by condensation heat transfer using the latent heat of fluid perfluorinated organic compounds to melt solder alloys for attaching an electronic component to a printed circuit board and the like. More particularly, the present invention relates to such soldering techniques using certain high boiling chemically inert fluid perfluorinated polyethers.

II. Prior Art

Vapor phase condensation reflow soldering is a well known procedure for mass soldering of wire terminal pins to printed circuit boards and the like. For example, U.S. Pat. No. 3,866,307 discloses a condensation reflow soldering technique. In simple terms, reflow soldering is done by first applying a predetermined amount of solder paste or cream to a surface to be soldered and heating the assembly to melt the solder and to thus form the joint. Vapor phase soldering utilizes the latent heat of condensation of vaporized fluid to melt the solder and requires the fluid, among other things, to be exceedingly chemically inert, to have a necessary boiling point range, and to be safe and facile to handle. Certain perfluorinated organic compounds, that is to say, organic compounds which are fully fluorinated, such as alkanes, ethers and tertiary amines, are well known versatile fluids that possess the just-mentioned properties and thus have found use in vapor phase soldering of electronic components. These known compounds, however, possess certain limitations when used as fluids in vapor phase soldering.

From a chemical standpoint those perfluorinated organic compounds which have been used commercially as vapor phase soldering fluids can be generally classified as (1) perfluoro-tertiary amines (PTA), such as perfluorotriamylamine, (2) perfluoro-perhydrophenanthrene (PPH) and (3) mixed perfluoropolyethers (MPE). MPE's are random copolymers having the formula

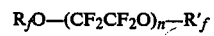

$$CF_3-(OCFCF_2)_m-(OCF_2)_n-OCF_3$$
with CF_3 branch wherein m/n is about 40/1.

It is known that PTA's can be produced by electrochemical fluorination of the corresponding tertiary amine and suffer the drawback of possessing less thermal stability and chemical stability than desired. During use as a vapor phase soldering fluid very corrosive hydrofluoric acid forms due to degradation of some less stable PTA's. PTA's also tend to break down after long thermal exposure into detectable quantities of the toxic gas perfluoroisobutylene.

Although there is less concern of toxic and corrosive decomposition of PPH as compared to PTA, soldering fluxes dissolve in PPH to an undesirable high level. The build up of flux in the PPH fluid results in the deposition and subsequent decomposition of the flux on the heater elements used to vaporize the PPH fluid. Furthermore, PPH fluids are consumed during vapor phase soldering in an excessive amount. PPH fluids suffer excessive losses from vapor phase soldering equipment by evaporation and diffusion. These losses of expensive PPH fluid represent an expense that should be minimized.

MPE's are made by a polymerization process using perfluoroalkylene epoxides. Prior art MPE's are terminated with various terminal groups. Because of their manner of manufacture, MPE fluids are composed of mixtures of oligomers and possess a relatively wide boiling point range rather than a more desirable narrow range which PPH and PTA fluids desirably exhibit.

SUMMARY OF THE INVENTION

The present invention provides a method of soldering wherein components and substrates to be soldered together are immersed in a vapor bath to melt the solder. Thereafter, the soldered unit is withdrawn from the bath and cooled to solidify the solder. The vapor bath is composed predominantly of an evaporable perfluorinated polyether having the formula

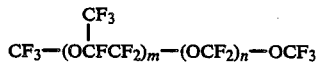

$$R_fO-(CF_2CF_2O)_n-R'_f$$

wherein n is an integer of about 3 to 11. Each of $R_f$ and $R'_f$ is an independently selected perfluorinated $C_1$–$C_5$ alkyl radical including perfluoromethyl, perfluoroethyl, perfluoropropyl, perfluoroisopropyl, perfluorobutyl, perfluoroisobutyl, perfluoro-t-butyl, etc., and having a boiling point in the range of about 130°–330° C. Perfluorinated polyethers, when used as the heat exchange medium in accordance with the present invention in vapor phase soldering, provide improved performance in terms of being very stable with attendant toxicity and corrosion problems being minimized, in terms of possessing low fluid usage rate, in terms of low soldering flux solubility, and in terms of providing a narrow boiling point temperature range.

BRIEF DESCRIPTION OF THE DRAWINGS

The invention will be more fully understood from the following detailed description taken in conjunction with the accompanying drawings, wherein.

DETAILED DESCRIPTION OF THE INVENTION

The present invention provides an improved method of vapor phase soldering, wherein a particular class of fluorinated organic compounds are used in a vapor phase to supply the energy for melting solder. The class of fluorinated compounds includes fluorinated polyethers of the formula

$$R_f-(OCF_2CF_2)_n-OR'_f$$

wherein n is an integer of about 3 to 11. Each of $R_f$ and $R'_f$ is an independently selected perfluorinated $C_1$–$C_5$ alkyl radical, including perfluoromethyl, perfluoroethyl, perfluoropropyl, perfluoroisopropyl, perfluorobutyl, perfluoroisobutyl and perfluoro-t-butyl. These perfluorinated polyethers are advantageously used in conventional apparatus and methods for vapor phase soldering reflow techniques.

The reflow process may be a batch operation or a continuous operation.

A batch vapor phase heating system may consist of a vessel containing one or more immersion heaters and one or more overhead vapor condensing coils containing a suitable coolant. The process fluid in the bottom of the vessel is heated to boiling by the immersion heaters. For any rate of boiling, equilibrium is reached wherein the primary vapor above the boiling fluid exists in its saturated state up to a specific vapor height established by the vapor condensing coil within a given vessel. Because of the narrow boiling point range of the vapor phase soldering fluids of the present invention, use of means of temperature control of the vapors is not necessary. Power input to the heaters is regulated to vary the rate of vapor generation from the boiling fluid and not to control the temperature of the fluid. A work tray containing the electronic components and substrates to be soldered is used to position the same into the heated perfluoropolyether vapors. When the solder has reflowed as desired, the tray and soldered unit are withdrawn from the vessel and cooled.

Figure 1:
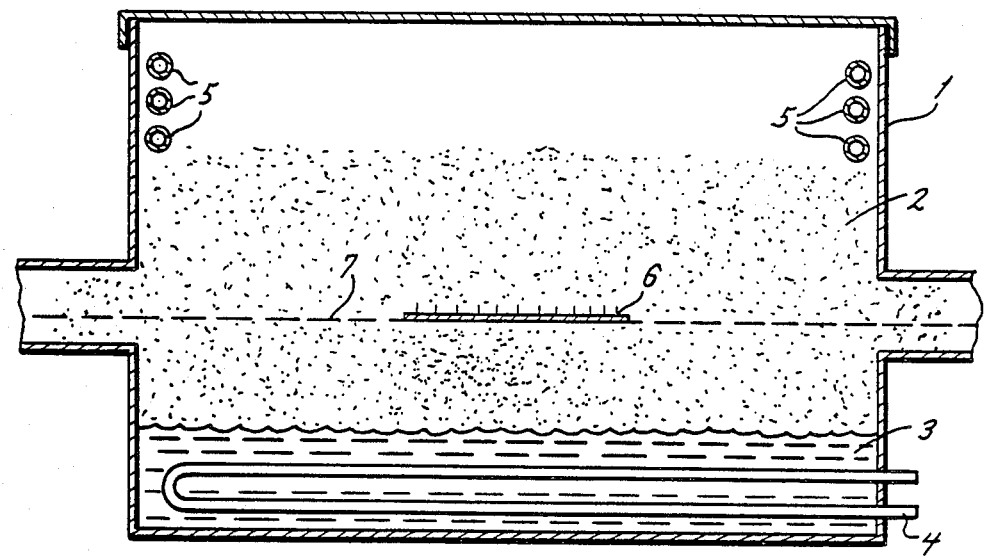
FIG. 1 is a sectional elevational diagrammatic view of an apparatus which may be used to practice the method of the present invention.

FIG. 1 is a schematic representation of a continuous vapor phase reflow system. The system comprises a corrosion resistant vessel 1 in which the hot saturated process vapors 2 are generated by boiling the perfluoropolyether process fluid. The fluid 3 is heated by immersion heater 4. The height of the saturated vapors is maintained by vapor condensing coils 5 upon which excess vapor condenses. In operation the substrates with components 6 to be soldered are loaded onto the conveying belt 7 which carries the substrates to and through the vapor zone of the vessel, wherein the solder which had been deposited on the substrates melts. Movement of the substrates is continued at a desired speed from the vessel and the solder is cooled and solidified outside the perfluorinated vapor zone fluid.

The most preferred vapor phase soldering fluid of the present invention is perfluoroheptaglyme which has the formula

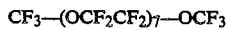

$CF_3-(OCF_2CF_2)_7-OCF_3$

The following examples describe various embodiments of the invention. Other embodiments within the scope of the claims herein will be apparent to one of ordinary skill in the art from consideration of the specification or practice of the invention disclosed herein. It is intended that the specification and the examples be considered exemplary only with the scope and spirit of the invention being indicated by the claims which follow the examples. Specifically, in the following examples the improvements obtained in using perfluoroheptaglyme fluid as compared to related perfluoro organics are demonstrated.

It is to be understood any suitable perfluorinated polyether within the above-mentioned general formula having a boiling point in the range of 130°-330° C. and having a molecular weight in the range of about 500-1500 may likewise be used in the vapor phase soldering process of the present invention. Commonly, the perfluoromethyl polyethylene oxides are known as perfluoropolyglymes. This term does not precisely follow an officially recognized chemical nomenclature system but is based on the term glyme referring to glycols terminated with methyl groups. On this basis $CH_3-(OCH_2CH_2)_7-OCH_3$ is called heptaglyme. When heptaglyme is fully fluorinated, the resulting product is known as perfluoroheptaglyme and has the formula $CF_3-(OCF_2CF_2)_7-OCF_3$ and may be abbreviated as PFHG. More properly, PFHG can be named 1,1,1,3,3,4,4,6,6,7,7,9,9,10,10,12,12,13,13,15,15,16,16,18,18,19,19,21,21,22,22,24,24,24-tetratriacontafluoro-2,5,8,11, 14,17,20,23-octaoxatetracosane. As previously described, the terms $R_f$ and $R'_f$ refer to alkyl terminal groups which have been perfluorinated. Thus, among others, included in the process of the present invention are the compounds:

Perfluorinated triglyme, perfluorinated triethylene glycol methylethyl ester, perfluorinated tetraglyme, perfluorinated tetraethylene glycol methylethyl ester, perflourinated pentaglyme, perfluorinated pentaethylene glycol methylethyl ether, perfluorinated pentaethylene glycol diethyl ether, perfluorinated hexaglyme, perfluorinated hexaethylene glycol methylethyl ether, perfluorinated hexaethylene glycol diethyl ether, perfluorinated heptaglyme, perfluorinated heptaethylene glycol methyethyl ether, perfluorinated heptaethylene glycol diethyl ether, perfluorinated octaglyme, perfluorinated octaethylene glycol methylethyl ether, perfluorinated octaethylene glycol diethyl ether, perfluorinated nonaglyme, perfluorinated nonaethylene glycol methylethyl ether, perfluorinated nonaethylene glycol dimethyl ether, perfluorinated decaglyme, perfluorinated decaethylene glycol methylethyl ether, perfluorinated decaethylene glycol diethyl ether, perfluorinated undecaglyme, and cyclic compounds thereof resulting from internal carbon to carbon coupling.

Perfluoroheptaglyme may be more generally described as a low molecular weight perfluoropolyethylene oxide. The fluid is preferably a pure compound with a specific molecular weight and a narrow boiling point range rather than a polymeric mixture having wide molecular weight and boiling point ranges However, the fluid may contain in addition to perfluoroheptaglyme both higher and lower boiling perfluroethylene oxide components that result from impurities in the heptaglyme raw material and also from degradation reactions and intramolecular radical coupling reactions that may occur during fluorination. The fluid may also contain cyclic compounds resulting from intramolecular carbon to carbon coupling of perfluoroheptaglyme. The amounts of minor components also can be varied by fractional distillation of the perfluorinated mixture. The fluid therefore preferably contains principally perfluoroheptaglyme as an 80-100% component.

In the examples all weights are given on a weight basis unless otherwise indicated.

EXAMPLE 1

This example shows the preparation of perfluoroheptaglyme which is useful in the practice of the present invention. The preparation procedure employed was an adaptation of the liquid phase fluorination procedures of (1) Kowanko et al., FUEL, 57, 768 (1978) and (2) Grakauskas, J. Org. Chem., 35 (No. 3), 723 (1970).

To a 300 ml Hastelloy-C autoclave were added 7.00 g of heptaglyme, 60.0 g of calcium carbonate and 150 g of 1,1,2-trichloro-1,2,2-trifluoroethane solvent. The autoclave was sealed and cooled to −13° C. The headspace in the autoclave was purged with nitrogen to remove the oxygen therein. A blade stirrer within the autoclave was operated at 1350 rpm. A mixture of fluorine and nitrogen was introduced to the autoclave in the ratio of 80 sccm fluorine and 150 sccm nitrogen for 213 minutes. The mixture was then adjusted to 20 sccm fluorine and 20 sccm nitrogen for 88 minutes. The total amount of fluorine introduced to the reactor was 29.7 g. The theoretical fluorine requirement is 25.4 g. The reactor temperature through most of the run was maintained at −10° C. The resulting reaction mixture was filtered. The solids were washed with the above-mentioned solvent. The solvent was removed from the filtrate using a rotary evaporator to produce 3.41 g of oil. Gas chromatographic analysis of the oil found 22.1% perfluoroheptaglyme, 46.2% low boilers, and 37.7% high boilers.

The resulting perfluoroheptaglyme was separated from the reaction mixture by fractional distillation.

The physical properties of the perfluoroheptaglyme fluid isolated as the main cut from the fractional distillation are described in Table 1.

TABLE 1

| Physical Properties of Perfluoroheptaglyme (PFHG) | |
|---|---|
| Property | Value |
| Vap. Density @ BP, g/l at 215° C. | 27.2 |
| BP @ 760 mm Hg, °C. | 215 |
| Viscosity @ 25° C., cSt | 2.6 |
| Viscosity @ 210° C., cSt | 0.23 |
| Density @ 25° C., g/cc | 1.72 |
| Vapor Specific Heat @ BP, J/(kg)(K) | 53.3 |
| Liquid Specific Heat @ BP, J/(kg)(K) | 74.3 |
| Surface Tension at 20° C., N/m | 0.015 |
| Pour Point, °C. | −25 |
| Vap. Press. @ 25° C., mm Hg | 0.04 |
| Thermal Conductivity @ BP, W/(m)(K) | 0.057 |
| Average Molecular Weight | 1000 |
| Coefficient of Expansion, ml/(ml)(°C.) | 0.002 |
| Volume Resistivity, ohm-cm | $3.1 \times 10^{10}$ |
| Dielectric Constant | 1.91 |
| Dielectric Strength, V/m | 11 |
| Dissipation Factor | 0.0008 |

Perfluoroheptaglyme has a 215° C boiling point which makes it eminently suitable for use in vapor phase soldering with many conventional solder alloys. Suitable tin-lead solder compositions are 55/45—80 Pb). The eutectic composition is 63/37 (Sn/Pb) with a melting point of about 183° C. It is understood that solder used in the practice of the present invention can be any suitable composition used for vapor soldering applications. Normally, soldering compositions melting below or about 220° C. are preferred.

Perfluoroheptaglyme is essentially nontoxic having an LD50 greater than 10 g/kg in rats. In addition perfluoroheptaglyme has excellent dielectric properties that make it most suitable for use in electronics manufacturing. Fluids that presently serve the vapor phase soldering market have some serious short comings as mentioned above. These deficiencies include hydrofluoric acid generation, perfluoroisobutylene (PFIB) generation fluid loss via diffusion and drag out, flux solubility and a boiling point that changes during use. Perfluoroheptaglyme's surprising superiority as a vapor phase soldering fluid is more specifically described in the subsequent examples.

EXAMPLE 2

The stability of perfluoroheptaglyme respect to hydrofluoric acid generation was demonstrated using Accelerated Rate Calorimetry. HF generation should be minimized because HF is toxic and is corrosive to soldering equipment. A 50/50 by weight mixture of perfluoroheptaglyme and 50% aqueous sodium hydroxide was evaluated in a stirred calorimeter bomb constructed of nickel, molybdenum, and chromium wrought alloy. The bomb was charged with 5.2 g of perfluoroheptaglyme and 4.6 g of 50% sodium hydroxide solution. The mixture was stirred at 500 rpm. The temperature of the bomb and its contents was increased from ambient to 245° C. Very low heat generation was observed between 110° and 150° C. Between 150'° and 245° C. there was no observable heat generated. Analysis of the caustic layer recovered from the bomb found 36 ppm fluoride ion. This corresponds to 0.005 percent of the fluorine in perfluoroheptaglyme. Translated to hydrofluoric acid generation in a vapor phase soldering unit, 1 kilogram of perfluoroheptaglyme would generate only about 0.000034 kilogram of hydrogen fluoride.

EXAMPLE 3

Perfluoroheptaglyme (656 g) was added to a batch vapor phase soldering apparatus. The fluid was heated to boiling. A conventional printed circuit test board to which solder paste of a 63/37 (Sn/Pb) composition and surface mounted electronic components had been applied were immersed into the vapors of the boiling fluid. The heat transferred from the condensing perfluoroheptaglyme vapors melted the solder. The test board was removed from the soldering unit and cooled. All 102 lands where solder paste had been applied had sufficiently coalesced after melting. Bridging occurred at two sets of adjacent lands where a large excess of paste was inadvertently used.

Using a 1.4 KVA power source and a one liter heating mantle, the time required to reflow the solder paste was measured. Solder (63/37) (Sn/Pb) was applied to the test board and dried. The board was immersed in the perfluoroheptaglyme vapors. The solder completely melted in 35 seconds.

In this example the solder contained RMA+ flux and was obtained from UCM Heubach, Inc. The test board was made by Ditek Industries. The substrate was epoxy glass. The components placed on the board included two chip carriers, one with gull wing leads and the other with J leads, 8 no lead capacitors, and 46 lands spotted with paste but no electronic components.

EXAMPLE 4

Perfluoroheptaglyme's superior boiling point stability was demonstrated by comparing fractional distillation data for PFHG and several commercially available fluids. A plot of vapor temperature vs. weight percent distilled conveniently compares the boiling point stability of the tested fluids. The experimental procedure was that which has been described by Wenger in PROCEEDINGS OF NEPCON WEST (February 1987), Vol 1, pp. 135-150, "Evaluation and Characterization of Condensation Soldering Fluids without Sophisticated Analytical Equipment." The commercially obtained fluids that were fractionally distilled for comparison with perfluoroheptaglyme were Fluorinerts FC-70 and FC-5312 which are perfluorotriamylamines having different chemical stabilities, Fluorinert FC-5311 which is a perfluoroperhydrophenanthrene and Galden electronic fluid LS/215 which is a mixed perfluoropolyether. The Fluorinert electronic liquids were obtained from the 3M Company. LS/215 fluid was obtained from Montefluos.

The distillation flask was a 2 liter three necked flask modified to allow the refluxing condensate to flow past a sampling valve. The flask was charged with 1205 g of perfluoroheptaglyme. The fluid was heated to reflux with the power source adjusted to the same setting for all of the fluids being tested. Samples representing approximately 5 weight percent of the initial charge were collected at about 10 minute intervals. The amount of fluid withdrawn, the vapor temperature, liquid temperature, and atmospheric pressure were recorded. Sampling was terminated when the vapors in the flask began superheating. The vapor temperatures where then normalized to 760 torr and plotted vs. weight percent distilled. Similar data sets were collected and corrected to 760 torr for a 1270.0 g charge of FC-70 and a 1283.09 g charge of FC-5311, a 1283.2 g charge of FC-5312 and 1284.0 g charge of Galden LS/215. The results from all the tested vapor phase soldering fluids have been graphically compared in FIG. 2.

Figure 2:
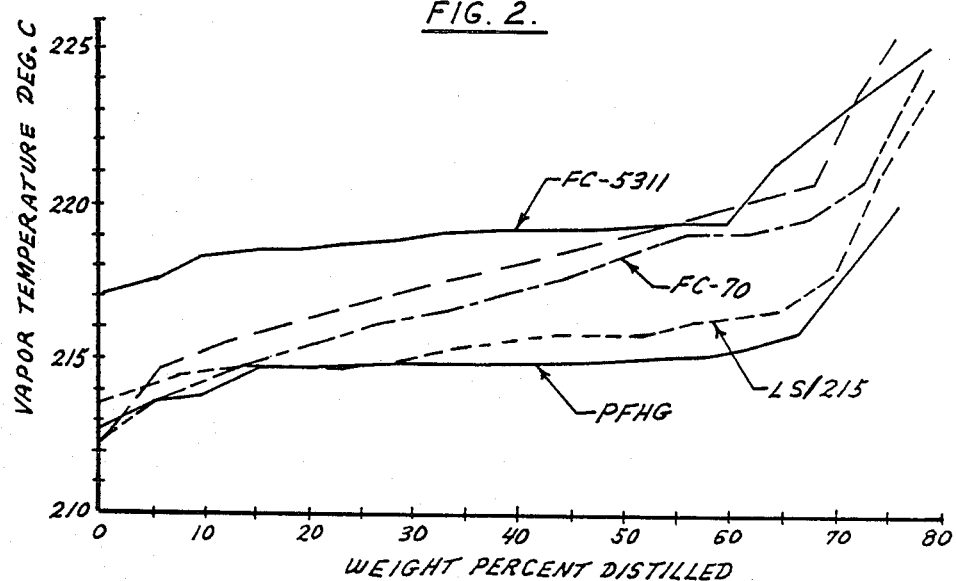
FIG. 2 shows the fractional distillation curves of a vapor phase soldering fluid of the present invention compared with such curves of several known commercial vapor phase soldering fluids.

FIG. 2 shows that perfluoroheptaglyme has a constant vapor temperature in the 15-63 weight percent distillation range of the plot. The boiling points of all of the fluids except FC-5311 and perfluoroheptablyme increase throughout the distillation. FC-5311 showed a sharp increase in its boiling point beginning when about 60% of the fluid was distilled. The greater stability of perfluoroheptaglyme's boiling point is a result of higher purity and greater chemical stability.

EXAMPLE 5

This example shows the superior heat transfer from perfluoroheptaglyme (PFHG) vapors to the solder on the basis of several contributing physical properties. Table 2 summarizes the pertinent physical properties of PFHG and other commercial fluids having a boiling point about 215° C.

TABLE 2

| Comparison of Parametric Physical Properties in Condensation Heat Transfer | | | | |
|---|---|---|---|---|
| | Fluid | | | |
| Property | PFHG | FC-70 | FC-5311 | LS/215 |
| Average Molecular Weight | 1000* | 820** | 624** | 600** |
| Vapor Density @ BP, g/l | 27.2 | 20.6 | 15.7 | 22.7 |
| Vapor Specific Heat @ BP, J/(kg)(K) | 53.3 | 53.0 | 36.3 | — |
| Liquid Specific Heat @ BP, J/(kg)(K) | 74.3 | 75.0 | 72.2 | — |
| Nominal Boiling Point, ° C. | 215 | 215** | 215** | 215 |
| Density @ 25° C., g/cc | 1.72 | 1.93 | 2.02 | 1.80** |
| Surface Tension, N/m | 0.015 | 0.018** | 0.019** | 0.020** |
| Viscosity @ 25° C., cSt | 2.6 | 14** | 14** | 3.8** |
| Viscosity @ 210° C., cSt | 0.23 | 0.26** | 0.34** | 0.28 |
| Heat of Vap. @ BP, kJ/kg | 53.0 | 61.4 | 73.4 | 62.8** |
| Thermal Conductivity @ BP, W/(m)(K) | 0.057 | 0.050 | 0.043 | 0.071** |
| Coefficient of Expansion, ml/(ml)(K) | 0.0020 | 0.0017 | 0.0013 | 0.0011** |

*Determined by Gel Permeation Chromatography
**Values reported in manufacturer's literature Perfluoroheptaglyme has properties that are superior to other fluids and a few properties that are somewhat inferior. Among the few inferior properties are the heat of vaporization and density. Both of these properties are more than offset by other beneficial physical properties resulting in overall perfluoroheptaglyme superiority. For example, the heat of vaporization is important in that it is a measure of the heat content of a mass of vapor. However, in order to compare each fluid's ability to deliver heat to solder, it is convenient to calculate the heat available per unit volume of vapor. This is accomplished by calculating the product of the heat of vaporization and the vapor density. Results of these calculations are shown in Table 3

TABLE 3

| Fluid | Heat of Vaporization kJ/kg | × | Vapor Density kg/l | = | kJ/l |
|---|---|---|---|---|---|
| PFHG | 53.0 | | 0.0272 | | 1.442 |
| FC-70 | 61.4 | | 0.0206 | | 1.265 |
| FC-5311 | 73.4 | | 0.0157 | | 1.152 |
| LS/215 | 62.8 | | 0.0227 | | 1.426 |

Comparing the available heat in terms of kJ/l clearly demonstrates that perfluoroheptaglyme can deliver the largest amount of heat.

Liquid density is considered important with respect to faster dripping from the substrate being soldered. The faster drip rate is believed to make the surface available for more condensation. However, also contributing to making the surface available are lower viscosity and lower surface tension. Generally, chemically similar fluids that have a higher liquid density will also have a higher viscosity and surface tension. Therefore, these are offsetting properties, each of which contributes to a greater or lesser extent as a function of the properties of the substrate. However, the lower viscosity of perfluoroheptaglyme renders it superior in most heat transfer applications. Also contributing to perfluoroheptaglyme's heat transfer superiority is a lower surface tension compared to the other fluids.

In condensation heat transfer thermal conductivities through the liquid that coats the substrate are important. Perfluoroheptaglyme has an average value compared with the commercial fluids tested and shows superiority over FC-70 and FC-5311.

EXAMPLE 6

Fluid lost from vapor phase soldering equipment occurs as a result of drag out, evaporation, and diffusion. Interpretation of contributing physical properties indicates that fluid loss by any of the three mechanisms is less for perfluoroheptaglyme. Drag out of fluid by the substrates and conveyor apparatus will be the lowest for a fluid that has the lowest viscosity and the lowest surface tension. Table 2 above sets forth perfluoroheptaglyme as having the lowest value for both of these properties. Lower viscosities allow fluids to flow off the substrate and conveyor faster. Because perfluoroheptaglyme has the lowest viscosity, it will leave the thinnest residual film. The low surface tension of perfluoroheptaglyme indicates that it will spread more evenly and evaporate faster from the parts than the other fluids. Evaporation and diffusion fluid losses are normally lower for fluids with higher vapor density and higher molecular weight. Table 2 lists these properties and indicates that pefluoroheptaglyme has the highest vapor density and the highest molecular weight of the commercial fluids tested.

EXAMPLE 7

The rosin solubility of perfluoroheptaglyme and the commercial vapor phase soldering fluids tested were determined using the cloud point method described by Wright et al. in PROCEEDINGS OF NEPCON WEST, (February 1985) "Characteristics of Condensation Heating Fluids". A low rosin solubility is generally preferred, since it contributes to filterability of the solids resulting in decreased fouling of heater elements and increased onstream time.

A 0.16 g/ml solution of W-W rosin in isopropanol was prepared. The solution was added to a burette. The test fluids were charged to separate 600 ml beakers set up for magnetic stirring. The fluids were vigorously agitated and heated to boiling. The rosin solution was added dropwise until a slight haze was evident. The amount of rosin solution added to this point was used to calculate the rosin solubility. When the above procedure was applied to perfluoroheptaglyme, 320.8 g of the fluid was added to the 600 ml beaker. After the fluid was boiling, the solution containing 0.1596 g/ml of rosin in isopropanol was added dropwise from a burette. A slight haze was observed after 0.65 ml of the solution was added. The beaker was reweighed and found to contain 301.8 g of fluid. The solubility of rosin in perfluoroheptaglyme was calculated to be only 0.03%.

Similar experiments were performed with FC-70, FC-5311 and LS/215. The results of these experiments are reported in Table 4.

TABLE 4

Solubility of W-W Rosin in PFHG and Commercial Vapor Phase Soldering Fluids

| Fluid | Rosin Sol., Wt % |
|---|---|
| PFHG | 0.03 |
| FC-70 | 0.04 |
| FC-5311 | 0.07 |
| LS/215 | 0.03 |

EXAMPLE 8

The generation of the toxic compound perfluoroisobutylene (PFIB) is a significant shortcoming of many vapor phase soldering fluids. To test the level of PFIB generated by perfluoroheptaglyme, the concentration of PFIB above the boiling of perfluoroheptaglyme was determined. 150 ml of perfluoroheptaglyme was placed in a glass flask equipped with a condenser and brought to reflux at atmospheric pressure. Gas samples were taken at specific intervals just above the reflux zone of the perfluoroheptaglyme vapor. Although not confirmed by mass spectrometry, PFIB was measured using a gas chromatograph equipped with an electron capture detector. Tests with standards verified the detection limit of PFIB to be 1 ppb. The results of these tests have been set forth in Table 5 below.

TABLE 5

| Time Interval, hrs | PFIB Conc., ppb* |
|---|---|
| 0 | ND |
| 0.5 | 1.5 |
| 1.5 | 3.5 |
| 2.0 | 4.1 |
| 2.5 | 5.6 |
| 3.0 | 5.3 |
| 24.0 | 4.6 |
| 48.0 | 11.0 |
| 60.0 | 11.0 |
| 72.0 | 12.0 |
| 84.0 | 11.0 |

*The chromatographic peak attributed to PFIB was not confirmed by mass spectrometry.

The PFIB concentration above boiling FC-70 has been reported to be 140 to 3,000 ppb. Based on the above data, the concentration of PFIB above boiling perfluoroheptaglyme is several orders of magnitude less than that above boiling FC-70.

From the above it is clearly seen that perfluoroheptaglyme is a superior vapor phase soldering fluid. It has been demonstrated that from an overall standpoint perfluoroheptaglyme will outperform the commercial fluids tested. Specific superiority over commercial fluids has been demonstrated with respect to PFIB generation, heat transfer, fluid loss, rosin solubility, and boiling point stability.

What is claimed is:

1. In a method of vapor phase heating wherein a fluorinated organic compound in a vapor phase is used as a heat source, the improvement comprising using heated vapor of a perfluorinated polyether selected from the group consisting of linear polyethers having the formula $R_f$—$(OCF_2CF_2)_n$—$OR'_f$ wherein n is an integer of about 3-11 and each of $R_f$ and $R'_f$ is independently selected from the group consisting of perfluorinated $C_1$-$C_5$ alkyl radicals.

2. The method of claim 1 wherein the perfluorinated polyether is perfluoroheptaglyme.

3. The method of claim 1 wherein the boiling point of the perfluorinated polyether is in the range of 130°-330° C.

4. In a method of vapor phase heating wherein a fluorinated fluorinated compound in a vapor phase is used as a heat source, the improvement comprising heating solder to induce melting thereof by using heated vapor of perfluorinated polyether having the formula $R_f$—$(OCF_2CF_2)_n$—$OR'_f$ wherein n is an integer of about 3-11 and each of $R_f$ and $R'_f$ is independently selected from the group consisting of perfluorinated $C_1$-$C_5$ alkyl radicals.

5. The method of claim 4 wherein the perfluorinated polyether is perfluoroheptaglyme.

6. The method of claim 4 wherein the boiling point of the perfluorinated polyether is in the range of 130°-330° C.

7. A method of vapor phase reflow soldering a plurality of electronic components to a substrate comprising the steps of:
    (a) maintaining in the bottom part of a container a pool of liquid perfluorinated polyether having the formula $R_f$—$(OCF_2CF_2)_n$—$OR'_f$ wherein n is an integer of about 3-11 and each of $R_f$ and $R'_f$ is an independently selected perfluorinated $C_1$-$C_5$ alkyl;
    (b) heating the liquid fluorinated polyether to generate vapor of such polyether;
    (c) in the upper part of the container, cooling the vapor of said polyether to condense the vapor of polyether so as to provide a space between the bottom part of the container and the top part of the container saturated with vapor of said polyether;
    (d) placing the components to be soldered with the solder and substrate into the vapor of said polyether;
    (e) after a dwell time in the vapor sufficient to reflow the solder, removing the thus soldered unit from the vapor of said polyether; and
    (f) allowing the soldered unit to cool.

8. The process of claim 7 wherein the perfluoropolyether is perfluoroheptaglyme.

9. The process of claim 7 wherein the perfluoropolyether is perfluoropentaglyme.

10. The process of claim 7 wherein the perfluoropolyether is perfluorooctaglyme.

11. The process of claim 7 wherein the perfluoropolyether is perfluorinated pentaethylene glycol methylethyl ether.

12. The process of claim 7 wherein the perfluoropolyether is perfluorinated hexaethylene glycol methylethyl ether.

13. The process of claim 7 wherein the process is a batch operation.

14. The process of claim 7 wherein the process is a continuous operation wherein the components to be soldered move generally horizontally in a continuous fashion through the polyether vapor.

15. The process of claim 7 wherein soldering occurs between an electronic component and a printed circuit board.

16. The process of claim 15 wherein the board is a multi-layered board.

* * * * *

UNITED STATES PATENT AND TRADEMARK OFFICE
CERTIFICATE OF CORRECTION

PATENT NO. : 4,871,109

DATED : October 3, 1989

INVENTOR(S) : Kalota et al

It is certified that error appears in the above-identified patent and that said Letters Patent is hereby corrected as shown below:

In column 1, line 39, delete "fluidscan" and insert therefor --fluids can--.

In column 5, line 38, delete "80 Pb" and insert therefor --80/20 (SN/Pb)--.

In column 5, line 60, insert the word "with" after "perfluoroheptaglyme".

Signed and Sealed this

Thirtieth Day of October, 1990

Attest:

HARRY F. MANBECK, JR.

*Attesting Officer*     *Commissioner of Patents and Trademarks*